United States Patent [19]

Heinz et al.

[11] Patent Number: 4,484,879

[45] Date of Patent: Nov. 27, 1984

[54] ROLLER PRESS FOR THE PRODUCTION OF GRANULES OR MOLDINGS

[75] Inventors: Robert Heinz, Mannheim; Karl Sommer, Palzing, both of Fed. Rep. of Germany

[73] Assignee: BASF Aktiengesellschaft, Ludwigshafen, Fed. Rep. of Germany

[21] Appl. No.: 477,395

[22] Filed: Mar. 21, 1983

[30] Foreign Application Priority Data

Mar. 5, 1982 [DE] Fed. Rep. of Germany ....... 3207856

[51] Int. Cl.$^3$ ......................... B29F 3/012; B29F 3/06; B29C 3/02

[52] U.S. Cl. .................................. 425/145; 264/40.5; 264/40.7; 425/149; 425/170; 425/171; 425/194; 425/327

[58] Field of Search ............... 425/149, 135, 170, 145, 425/171, 194, 327; 264/40.5, 40.7, 117–118, 141

[56] References Cited

U.S. PATENT DOCUMENTS

| | | | |
|---|---|---|---|
| 2,175,342 | 10/1939 | Crawford | 425/145 |
| 2,369,553 | 2/1945 | Fields | 425/170 |
| 2,566,854 | 9/1951 | Rhodes | 264/40.7 |
| 2,977,631 | 4/1961 | Komarek et al. | 425/145 |
| 3,090,992 | 5/1963 | Schlachter et al. | 425/145 |
| 3,146,287 | 8/1964 | Kleine-Albers | 425/145 |
| 3,274,645 | 9/1966 | Chase | 425/170 |
| 3,674,397 | 7/1972 | Harris | 425/145 |
| 3,734,659 | 5/1973 | Harris | 425/145 |
| 3,901,635 | 8/1975 | Greenberger | 425/149 |
| 4,368,165 | 1/1983 | Bergendahl | 425/149 |

FOREIGN PATENT DOCUMENTS

| | | | |
|---|---|---|---|
| 2950072 | 6/1981 | Fed. Rep. of Germany | 425/149 |
| 55-109600 | 8/1980 | Japan | 264/40.4 |
| 57-72811 | 5/1982 | Japan | 264/40.4 |
| 1041194 | 9/1966 | United Kingdom | 425/171 |

*Primary Examiner*—Jeffery Thurlow
*Attorney, Agent, or Firm*—Keil & Weinkauf

[57] ABSTRACT

A roller press comprising a drivable pair of rollers with a defined nip between these, one or more stuffing screws, associated with the nip, for feeding the material to be granulated to the nip, and a plate, movable in the direction of the screw axis, on which plate the screw and drive are fixed and a pin which can be brought up against a stationary load cell is held.

4 Claims, 1 Drawing Figure

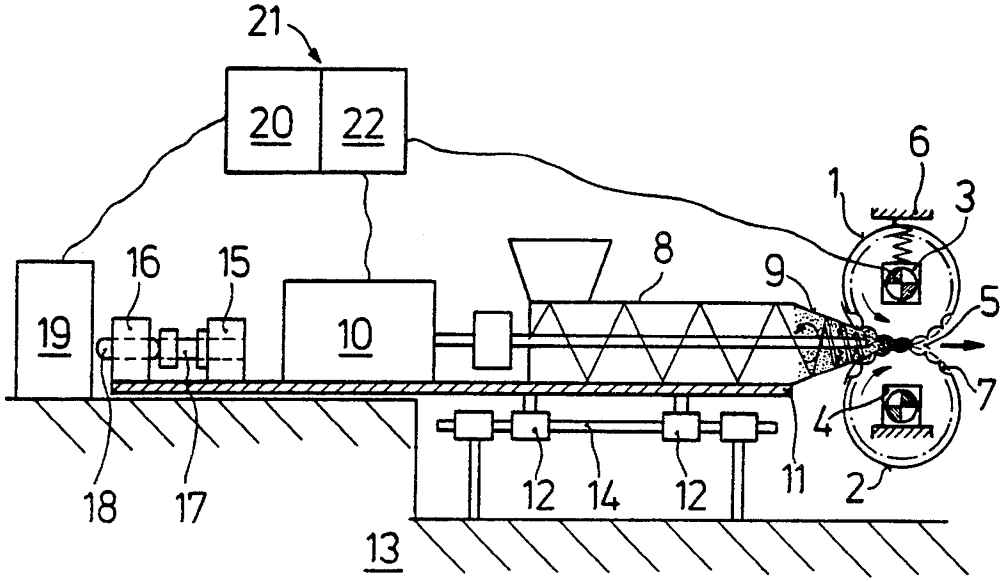
21
20
22
6
1
3
8
9
5
16
15
19
10
7
4
18
17
12
14
12
11
2
13

ROLLER PRESS FOR THE PRODUCTION OF GRANULES OR MOLDINGS

The present invention relates to a roller press for the production of granules or moldings from a pourable material, which roller press comprises a drivable pair of rollers which forms a defined nip and one or more stuffing screws, associated with the nip, for feeding the material to be compressed to the nip.

In the production of granules or moldings by means of a pair of counter-rotating rollers, the pourable material is fed to the nip by one or more stuffing screws. This builds up, in front of the nip, a pressure which depends on the speed and geometry of the stuffing screw and this pressure is one of the factors determining the properties of the granules or moldings, such as hardness and size, as well as being a factor in determining the press throughput. At a constant speed of the stuffing screw and of the rollers, the end product properties only change if the properties of the feed material change.

It is an object of the present invention to provide a roller press of the type of construction described at the outset, in which the pressure in front of the nip can be controlled to a desired constant value which depends on the material to be processed. It is further object of the invention to permit the roller speed to be matched to the pressure in front of the nip, so as to maximise throughput.

We have found that this object is achieved in a roller press for the production of granules or moldings from a pourable material, which roller press comprises a drivable pair of rollers which forms a defined nip, one or more stuffing screws, associated with the nip, for feeding the material to be compressed to the nip, a plate, movable in the direction of the screw axis, on which plate the stuffing screw is mounted and on which there is held a pin movable in the same direction by means of a setting screw and acting on a stationary load cell.

In a proper embodiment of the invention, one of the two rollers is mounted so as to be movable in the direction of the nip in order to adjust the latter, and the bearing is connected to a hydraulic working cylinder.

It is moreover advantageous if one or more of the rollers is provided with mold cavities on its periphery.

Furthermore, it is advantageous to provide a device for controlling the stuffing screw drive, the set value-/actual value comparator of the device being connected to the load cell for measuring the pressure in front of the nip and the controller of the device acting on the control member of the drive.

Further details and advantages of the roller press according to the invention will emerge from the embodiment described below with reference to the drawing wherein:

The single FIGURE is a representative side elevation view of the present invention.

The drawing diagrammatically shows the roller press in lengthwise section. A pair of counter-rotating rollers 1 and 2 is rotatably held in bearings 3 and 4. For the purpose of adjusting the nip 5 formed between the rollers, one of the two bearings can be mounted so as to be movable towards the nip, and can be connected to a hydraulic working cylinder. Depending on the required shape and nature of the granules or moldings, the surface of the rollers is made smooth or provided with a profile or mold cavities 7. Both rollers are driven by an electric motor via a gearbox (these components not being shown in the drawing).

In front of the nip there is/are one or more stuffing screws 8, whose exit 9 is brought up close to the roller surface, the screw or screws being mounted, together with the drive 10, on a plate 11. The plate rests by bushings 12 on a pair of rails 14 anchored in the machine bed 13, and these bushings permit moving the plate in the direction of the screw axis.

Two holder blocks 15 and 16 are fixed to the rear part of the plate 11; in these blocks there are slidably guided, in the direction of the screw axis, on the one hand a setting screw 17 in a thread, and, on the other hand, a pin 18 in a hole. The pin is brought, by means of the setting screw, up against a load cell 19 fixed to the machine bed, and the pressure of material built up by the stuffing screw immediately in front of the nip is transmitted to this cell by the force of reaction. Under nominal load, the measurement travel of the load cell is less than 0.1 mm.

The measured value is transmitted to a set value/actual value comparator 20 of a control device 21, whose controller 22 acts on the control member of the drive 10 of the stuffing screw 8, so that, depending on the intended value preset in accordance with the material to be processed, the speed of the screw is regulated to a desired constant pressure in front of the nip. For this purpose, it must be possible to control the screw drive speed, for example by means of a variable-speed gearbox with servo-adjustment or by means of a three-phase current drive controlled with the aid of a frequency transformer.

In a further development of the roller press according to the invention, the controller 22 is additionally connected to a speed-controllable drive of the rollers 1 and 2, so that the roller speed can be matched to the pressure in front of the nip.

The method of measurement according to the invention moreover provides the possibility of determining the screw efficiency in Laboratory experiments and of developing suitable screw geometries. Furthermore, the measuring device makes it possible to remote-monitor the roller press or to trigger an alarm if the pressure in front of the nip changes in such a way that an adjustment is no longer possible because, for example, inadequate or no material is being fed or because the properties of the material are changing greatly.

However, the main advantages reside in the achievement of constant end product properties, for example in respect of abrasion, hardness and density, and in constant comminution characteristics.

We claim:

1. In a roller press for the production of granules or moldings from a pourable material, which roller press comprises a machine bed supporting a drivable pair of rollers which forms a defined nip and one or more stuffing screws positioned for feeding the material to be compressed to the nip, said stuffing screws having drive means connected to rotate the screws, the improvement comprising: a movable plate which is movable with respect to the machine bed in the direction of the screw axis, said stuffing screw and drive means being mounted on said movable plate whereby the reaction force of the material fed to said nip will tend to urge said stuffing screw and said movable plate in said direction, a pin adjustably mounted on said plate for movement in the same direction by means of a setting screw, and a stationary load cell fixed to said bed, said load cell being contactable by said pin whereby a force related to said reaction force is exerted by said pin against said load cell.

2. A roller press as claimed in claim 1, wherein one of the two rollers is mounted so as to be movable in the direction of the nip in order to adjust the latter, and the bearing of this roller is connected to a hydraulic working cylinder.

3. A roller press as claimed in claim 1 wherein one or more of the rollers has mold cavities on its periphery.

4. A roller press as claimed in claim 1 wherein a device for controlling the stuffing screw drive is provided, the set value/actual value comparator of the device being connected to the load cell for measuring the pressure in front of the nip and the controller of the device acting on the control member of the drive.

* * * * *